United States Patent
Miller et al.

(10) Patent No.: US 8,297,537 B2
(45) Date of Patent: Oct. 30, 2012

(54) ATOMIZATION SYSTEM

(75) Inventors: Frank Miller, Ilsfeld (DE); Hartmut Albrodt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 1714 days.

(21) Appl. No.: 10/530,922

(22) PCT Filed: Sep. 11, 2003

(86) PCT No.: PCT/DE03/03011
§ 371 (c)(1),
(2), (4) Date: Sep. 26, 2005

(87) PCT Pub. No.: WO2004/035188
PCT Pub. Date: Apr. 29, 2004

(65) Prior Publication Data
US 2006/0060679 A1    Mar. 23, 2006

(30) Foreign Application Priority Data
Oct. 14, 2002 (DE) .................... 102 47 765

(51) Int. Cl.
*B05B 7/04* (2006.01)
(52) U.S. Cl. ........ 239/433; 239/419; 239/427; 239/434; 239/499; 239/554; 239/567; 239/584; 48/215
(58) Field of Classification Search ........ 261/78.1–79.2; 48/215; 239/418, 419, 426, 427, 433, 434, 239/499, 500, 504, 554, 555, 567, 584, 596
See application file for complete search history.

(56) References Cited

U.S. PATENT DOCUMENTS

| | | | | |
|---|---|---|---|---|
| 1,631,771 A | * | 6/1927 | Sheather | 239/434 |
| 3,913,845 A | * | 10/1975 | Tsuji | 239/567 |
| 3,971,847 A | | 7/1976 | Houseman | |
| 3,982,910 A | | 9/1976 | Houseman et al. | |
| 4,381,187 A | | 4/1983 | Sederquist | |
| 4,383,649 A | * | 5/1983 | Reed et al. | 239/433 |
| 6,045,772 A | | 4/2000 | Szydlowski et al. | |
| 6,872,379 B2 | * | 3/2005 | Zahringer et al. | 48/215 |
| 2003/0077210 A1 | * | 4/2003 | Nau et al. | 422/194 |

FOREIGN PATENT DOCUMENTS

| | | |
|---|---|---|
| DE | 196 50 559 | 3/1998 |
| DE | 100 55 613 | 5/2002 |
| JP | 200063105 | 2/2000 |
| JP | 2000191304 | 7/2000 |
| JP | 2001354402 | 12/2001 |
| SU | 1 020 697 | 5/1983 |
| WO | WO 01/53675 | * 7/2001 |

OTHER PUBLICATIONS

Database WPI, Section PQ, Week 198446, Derwent Publications Ltd., London, GB, AN 1984-286786.

* cited by examiner

*Primary Examiner* — Steven J Ganey
(74) *Attorney, Agent, or Firm* — Kenyon & Kenyon LLP

(57) ABSTRACT

An atomization system for fuels, particularly for charging a chemical reformer for obtaining hydrogen, includes at least one metering device for metering fuel at at least one metering point into a connecting tube capable of receiving a temperature-adjusted substance stream. The connecting tube features at least one atomization point located downstream of the at least one metering point.

14 Claims, 2 Drawing Sheets

ATOMIZATION SYSTEM

FIELD OF THE INVENTION

The present invention relates to an atomization system.

BACKGROUND INFORMATION

In fuel cell-supported transportation systems, so-called chemical reformers are used for obtaining the required hydrogen from hydrocarbon-containing fuels or for providing the reaction temperature of catalytic burners or afterburning devices.

All the substances needed by the reformer for the course of reaction such as air, water and fuel are ideally supplied to the reformer in the gaseous state. However, since the fuels such as methanol or gasoline, and water are preferably stored onboard the transportation system in liquid form, they must be heated so as to be vaporized shortly before being fed into the reformer. This requires a pre-evaporator (separate or integrated into the reformer) capable of providing adequate quantities of gaseous fuel and water vapor.

Since the hydrogen is normally consumed immediately, chemical reformers must be capable of adjusting the production of hydrogen to the demand without delay, e.g., in response to load changes or during start phases. Especially in the cold start phase, additional measures must be taken, since the reformer does not provide any waste heat. Conventional evaporators are not capable of generating adequate quantities of gaseous reactants without delay.

It is therefore practical to introduce the fuel into the reformer in a finely divided form with the aid of an atomization device, in which case, provided that there is a sufficient supply of heat, the vaporization process is improved by the large surface area of the finely divided fuel.

So-called catalytic burners provide the temperature required for the chemical reaction, in which the fuel among other things is reformed to hydrogen, for example. Catalytic burners are components featuring surfaces coated with a catalyst. In these catalytic burners, the fuel/air mixture is converted into heat and exhaust gases, the generated heat being conducted to the suitable components such as the chemical reformer or an evaporator via, for example, the lateral surfaces and/or via the warm exhaust-gas stream.

The conversion of fuel into heat is highly dependent on the size of the fuel droplets striking the catalytic layer. The smaller the size of the droplets and the more uniformly the catalytic layer is wetted with the fuel droplets, the more completely the fuel is converted into heat and the higher is the efficiency. In this way, the fuel is also converted more quickly, reducing pollutant emissions. Fuel droplets that are too large in size result in a coating of the catalytic layer and hence in a slow conversion rate. This leads to poor efficiency, especially in the cold start phase.

In addition, such an atomization system may be used for metering a urea-water solution directly into the exhaust-gas stream for exhaust-gas aftertreatment.

Devices for reforming fuels are described in, for example, U.S. Pat. No. 3,971,847. According to this document, metering devices located relatively far away from the reformer are used to meter the fuel via long supply lines into a temperature-adjusted substance stream and disperse it via a metering aperture at the end of the supply line into the substance stream, which flows to the location of the actual reforming process.

A particularly disadvantageous feature in the conventional devices described in the above-mentioned document is the fact that the long supply lines result in delays and inaccuracies in fuel metering, especially in the case of sharp load changes or warm start phases. If fuel metering is resumed following a stop phase for example, while the fuel is evaporating under the temperature influence from the supply line, this results in a delayed metering of fuel into the temperature-adjusted substance stream and to the reforming process, because the dead-space volume in the supply line must first be replenished. The same problem arises in the case of a particularly small load. Furthermore, long supply lines stand in the way of compact construction while increasing proneness to error and assembly cost.

SUMMARY

An atomization system according to an example embodiment of the present invention may have the advantage that the combination of a metering device, preferably in the form of a low-pressure fuel injector, with a metering point and an atomization device of arbitrary form allows for a compact construction and a precise mixture formation even at high temperatures.

Advantageously, a fuel injector may be used as metering device, as is known, for example, in connection with reciprocating internal combustion engines. The use of such injectors has several advantages. Thus, they allow for a particularly accurate open-loop or closed-loop control of fuel metering; the metering may be controlled based on several parameters such as the on-off ratio, the pulse frequency and possibly the stroke length. In this context, the dependence on pump pressure is considerably less marked than in metering devices which regulate the volume flow of the fuel via the line cross section, and the metering range is clearly greater. Moreover, the fuel injectors are reliable components that have proven effective, are known in terms of their behavior and are inexpensive and chemically stable vis-à-vis the fuels used; this is true especially of so-called low-pressure fuel injectors, which may be used in this instance because of the thermal decoupling.

It is also advantageous if the feed of a temperature-adjusted substance stream, for example an air stream, is possible between the metering and the atomization points, as well as downstream of the latter. This allows for the development of compact constructions for arbitrary mounting positions.

Furthermore, it may be advantageous to distribute a plurality of metering apertures over the surface of the connecting tube and in this manner to achieve a particularly uniform distribution of the mixture in the components receiving the metering.

A particularly advantageous specific embodiment may have the metering and atomization points situated jointly on the fuel injector. The fuel injector is then able to inject into the connecting pipe at any angle as needed, allowing for more complicated installation positions.

BRIEF DESCRIPTION OF THE DRAWINGS

Exemplary embodiments of the present invention are shown in simplified form in the figures and explained in greater detail in the following description.

DESCRIPTION OF EXAMPLE EMBODIMENTS

Figure 4A:
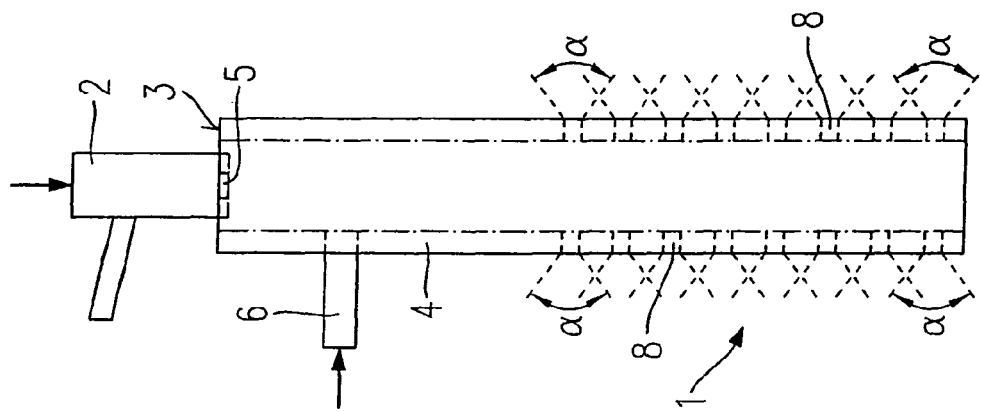
FIG. 4A shows a schematic representation of a fourth exemplary embodiment of an atomization system according to the present invention.

In the following, exemplary embodiments of the invention are described by way of example.

A suitable choice of parameters for low-pressure fuel injector 2 allows for the implementation of flow parameters $q_{dyn}$ and $Q_{stat}$ required for the reforming of methanol and gasoline for fuel cell components. In addition, there is good reason to keep the temperatures in the area of low-pressure fuel injector 2 as low as possible so as to be able to use cost-effective, standard fuel injectors. On the other hand, however, the strong variation of the temperature differences during the operation of atomization system 1 must be taken into account as well. Thus, the cold start phase features temperatures of only around 20-30° C., while 500-800° C. may be measured in full-load operation. During cold starts, it should accordingly be possible to meter the fuel very precisely and to disperse it very uniformly, since otherwise the efficiency drops due to the slow thermal conversion of the fuel.

The exemplary embodiments described below of atomization systems 1 designed according to the present invention take the aforementioned into account and allow for simple metering and atomization in a hot atmosphere, while providing a robust construction, application in different spatial constellations and the use of standard low-pressure fuel injectors.

To facilitate orientation, identical parts in the figures are provided with the same reference numerals throughout. The arrows represent the respective fuel and air flows.

Figure 1:
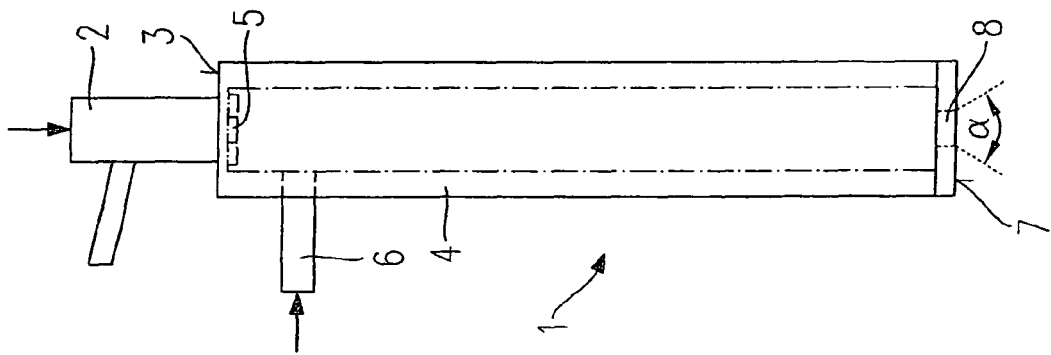
FIG. 1 shows a schematic representation of a first exemplary embodiment of an atomization system according to the present invention.

A first exemplary embodiment, schematically represented in FIG. 1, of an atomization system 1 according to the present invention is in the form of an atomization system 1 for the use of low-pressure fuel injectors 2. Atomization system 1 is particularly suitable for charging and atomizing fuel into a chemical reformer (not shown) or a catalytic burner for obtaining hydrogen.

In the first exemplary embodiment, low-pressure fuel injector 2 is situated at an inflow side 3 of a connecting tube 4. In this instance, connecting tube 4 is shaped such that, at the downstream side of low-pressure fuel injector 2, a metering point 5 is provided which limits the quantity of fuel injected into connecting tube 4.

At an arbitrary point downstream of metering point 5, another tube 6 discharges into connecting tube 4, allowing for an air flow to be fed into connecting tube 4. Tube 6 may discharge into connecting tube 4 at any angle, but preferably at approximately 90°.

At a downstream end face 7 of connecting tube 4, an atomization point 8 is provided, at which the mixture of air and fuel formed in connecting tube 4 is atomized. This may be implemented, for example, by an atomizer disk, a swirl disk or any other swirling or atomizing insert at atomization point 8. For this purpose, a cone angle α of the atomized jet may be adjusted freely to prevailing conditions by a suitable choice of atomization device.

Figure 2A:
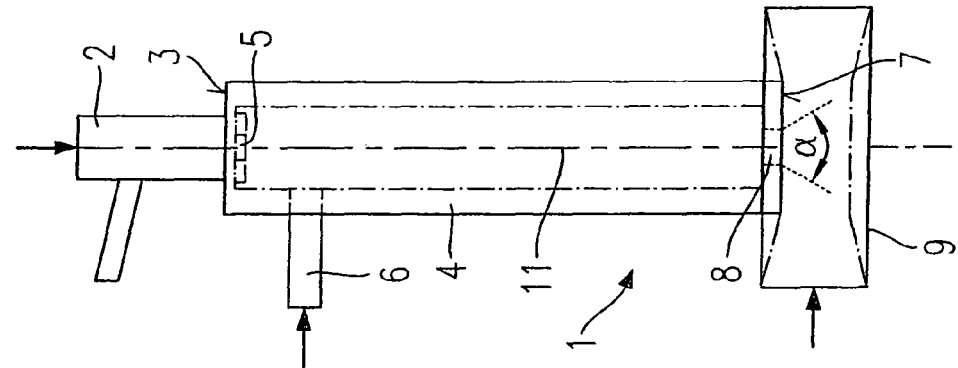
FIG. 2A shows a schematic representation of a second exemplary embodiment of an atomization system according to the present invention.
Figure 2B:
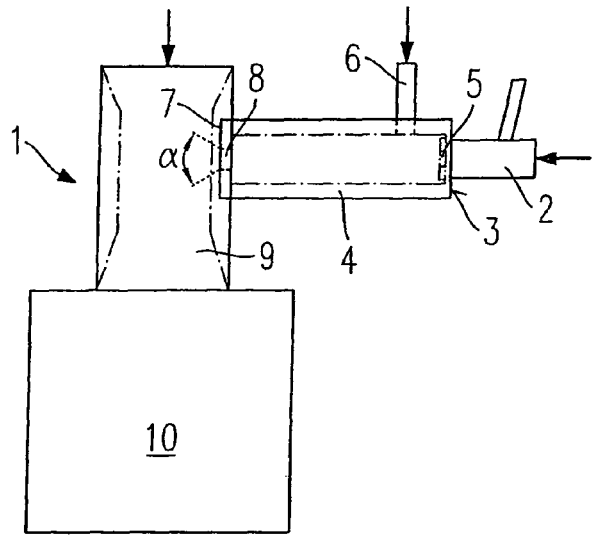
FIG. 2B shows a schematic representation of an installation situation of the exemplary embodiment shown in FIG. 2A.

FIGS. 2A and 2B show a second exemplary embodiment of atomization system 1 according to the present invention as a schematic diagram, as well as in an installation situation. In contrast to the exemplary embodiment shown in FIG. 1, the supply of air via tube 6 is optional. The actual formation of the mixture takes place in a tube section 9 at the downstream side of connecting tube 4. The advantage in this exemplary embodiment is that the air flow is fed directly into the already atomized fuel downstream of atomization point 8, resulting in a better distribution of the mixture.

Due to the perpendicular arrangement of tube section 9 relative to connecting tube 4, the exemplary embodiment shown in FIGS. 2A and 2B may be used to achieve other geometries, which may possibly allow for a more favorable installation position relative to other fuel cell components (10 in FIGS. 2B and 4B) not shown in detail.

Figure 3:
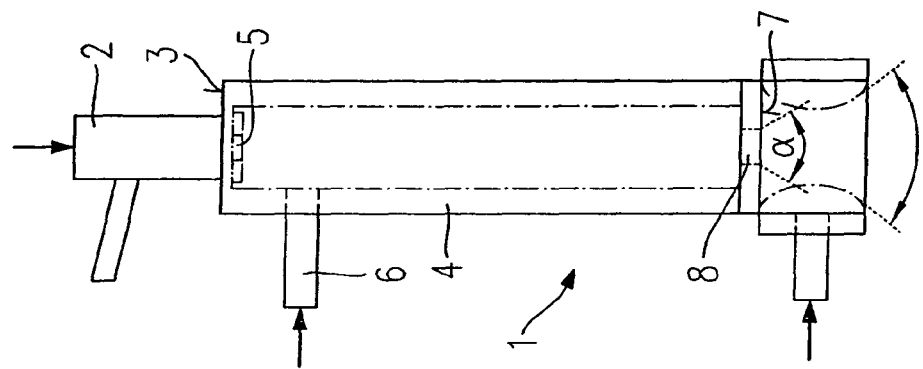
FIG. 3 shows a schematic representation of a third exemplary embodiment of an atomization system according to the present invention.

The exemplary embodiment shown in FIG. 3 represents a combination of the variants of the embodiment shown in FIGS. 1 and 2. As in the second exemplary embodiment, here the air flow is also supplied only downstream of atomization system 8, while the components that are to receive the metering are arranged in the direction of an axis 11 of connecting tube 4, as in the first exemplary embodiment.

Figure 4B:
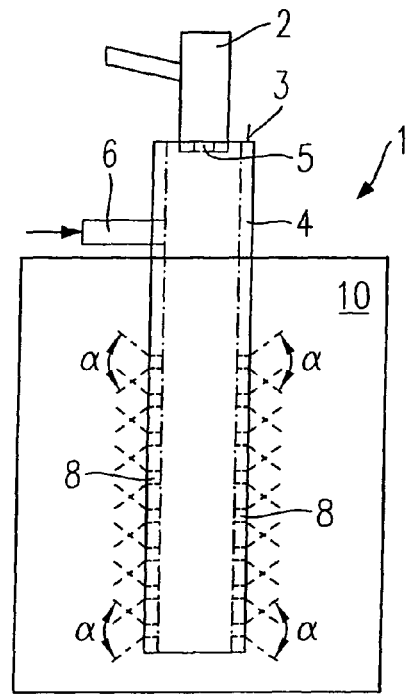
FIG. 4B shows a schematic representation of an installation situation of the exemplary embodiment shown in FIG. 4A.

FIGS. 4A and 4B show a further exemplary embodiment of a metering device designed according to the present invention, which is especially suitable for tight installation positions. In this case, the air flow is supplied via tube 6 upstream of atomization point 8, as in the first exemplary embodiment shown in FIG. 1. Atomization is then accomplished via numerous atomization points 8, which may be distributed over the surface area of connecting tube 4 in an arbitrary arrangement suitable for the prevailing conditions. The intersection of the individual fuel jets exiting from atomization points 8 allows for a particularly uniform distribution.

FIG. 4B shows an exemplary installation situation for the exemplary embodiment shown in FIG. 4A, which is distinguished by a particularly high degree of compactness due to the short installation length.

Figure 5:
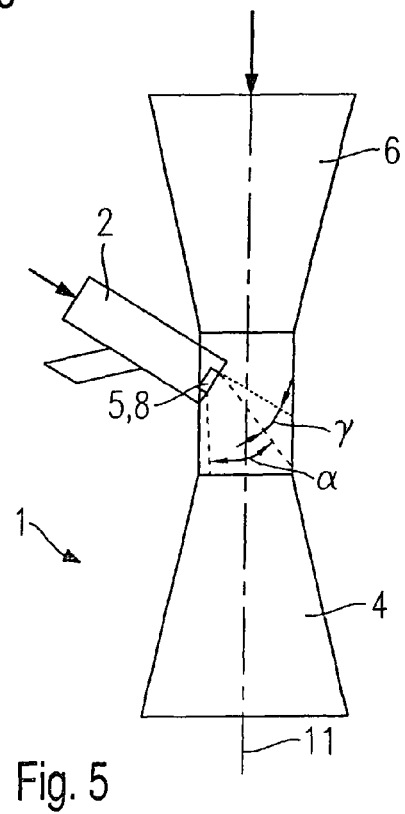
FIG. 5 shows a schematic representation of a fifth exemplary embodiment of an atomization system according to the present invention.

FIG. 5 represents an alternatively designed exemplary embodiment, in which low-pressure fuel injector 2 is not positioned on the inflow side of connecting tube 4, but laterally at arbitrary angles α (cone angle of the jet injected by fuel injector 2) and γ (angle of inclination of the jet). In this case, metering point 5 and atomization point 8 coincide, and the fuel mixture already atomized is introduced directly into the air flow at the above-mentioned angles as in the exemplary embodiment shown in FIG. 2. The metering/atomization takes place at a higher flow rate in the area of a narrowed cross section. An advantage in this case is also the possibility of a compact design while saving the cost of a separate atomization point.

Figure 6:
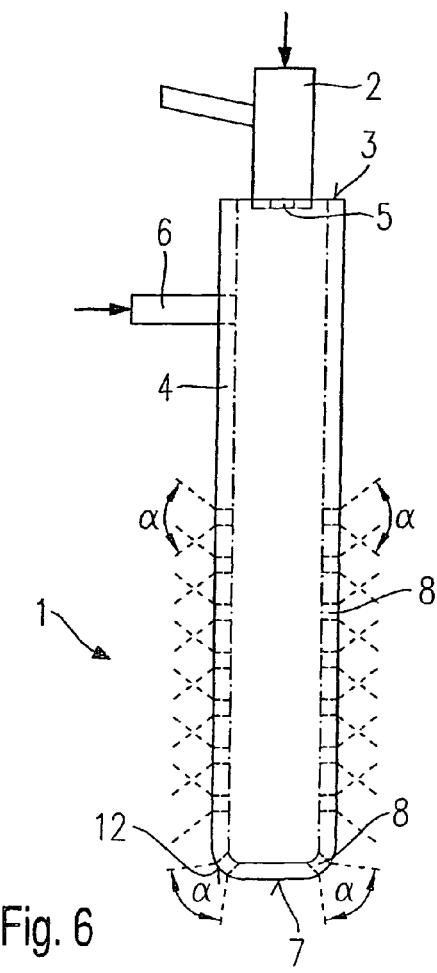
FIG. 6 shows a schematic representation of a sixth exemplary embodiment of an atomization system according to the present invention.

FIG. 6 shows another exemplary embodiment of a metering device designed according to the present invention, which, like the exemplary embodiment shown in FIGS. 4A and 4B, is especially suitable for tight installation positions. In this case, the air flow is supplied via tube 6 upstream of atomization point 8, as in the first exemplary embodiment shown in FIG. 1. Atomization is then accomplished via numerous atomization points 8, which may be distributed over the surface area of connecting tube 4 in an arbitrary arrangement suitable for the prevailing conditions. The intersection of the various fuel jets exiting from atomization points 8 allows for an especially uniform distribution.

In contrast to the exemplary embodiment shown in FIGS. 4A and 4B, the sixth exemplary embodiment features atomization points 8 also in the area of end face 7 of connecting tube 4, in particular at rounded corners 12. This allows for atomization even into spaces that are longer than connecting tube 4. In this instance, the cone angles $\alpha$ of the jet at atomization points 8 may be equal to those of the other atomization points 8 or may also be selected to be smaller or larger depending on the requirements.

The present invention is not limited to the exemplary embodiments described but is applicable to any other atomization systems.

What is claimed is:

1. An atomization system for a fuel, comprising:
    a connecting tube capable of receiving a temperature-adjusted substance stream; and
    at least one metering device configured to meter the fuel at at least one metering point into the connecting tube;
    wherein, the connecting tube has at least one atomization point located at a downstream end of the connecting tube and downstream of the at least one metering point;
    wherein the temperature-adjusted substance stream is supplied on a downstream side of the at least one atomization point; and
    wherein the metering device is a low pressure fuel injector.

2. The atomization system as recited in claim 1, wherein the system is for charging a chemical reformer for obtaining hydrogen.

3. The atomization system as recited in claim 1, wherein the low pressure fuel injector is positioned at an end face of the connecting tube.

4. The atomization system as recited in claim 1, wherein the metering point is formed on the low pressure fuel injector.

5. The atomization system as recited in claim 1, wherein the temperature-adjusted substance stream is additionally fed between the metering point and the atomization point.

6. The atomization system as recited in claim 5, wherein the temperature-adjusted substance stream is supplied via an additional tube.

7. The atomization system as recited in claim 6, wherein the additional tube discharges into the connecting tube at an angle of approximately 90°.

8. The atomization system as recited in claim 6, wherein the low pressure fuel injector is inclined at a specified angle with respect to an axis of the additional tube and an axis of the connecting tube.

9. The atomization system as recited in claim 1, wherein a mixture formed of the fuel and the substance stream is transmitted along an axis of connecting tube.

10. The atomization system as recited in claim 1, wherein a mixture formed of the fuel and the substance stream is transmitted perpendicular to an axis of the connecting tube.

11. The atomization system as recited in claim 1, wherein the at least one atomization point includes a plurality of atomization points.

12. The atomization system as recited in claim 11, wherein the atomization points are at least in part located in rounded corners of an end face of the connecting tube.

13. The atomization system as recited in claim 1, wherein the metering point and the atomization point are formed jointly on the low pressure fuel injector.

14. The atomization system as recited in claim 1, wherein the atomization point includes an atomization device in the form of one of a swirl disk, a spray orifice disk, a swirl insert or a swirl nozzle having at least one orifice.

* * * * *